United States Patent
Zemmouri

(10) Patent No.: US 11,353,223 B2
(45) Date of Patent: Jun. 7, 2022

(54) FACILITY FOR PRODUCING AND TREATING A GAS STREAM THROUGH A VOLUME OF LIQUID

(71) Applicant: STARKLAB, Nomain (FR)

(72) Inventor: Jaouad Zemmouri, Nomain (FR)

(73) Assignee: Starklab, Nomain (FR)

( * ) Notice: Subject to any disclaimer, the term of this patent is extended or adjusted under 35 U.S.C. 154(b) by 378 days.

(21) Appl. No.: 16/473,454

(22) PCT Filed: Dec. 19, 2017

(86) PCT No.: PCT/EP2017/083425
§ 371 (c)(1),
(2) Date: Jun. 25, 2019

(87) PCT Pub. No.: WO2018/122027
PCT Pub. Date: Jul. 5, 2018

(65) Prior Publication Data
US 2019/0331354 A1    Oct. 31, 2019

(30) Foreign Application Priority Data
Dec. 27, 2016    (FR) ..................... 1663416

(51) Int. Cl.
*B01D 47/00*    (2006.01)
*F24F 6/18*    (2006.01)
(Continued)

(52) U.S. Cl.
CPC ............ *F24F 6/18* (2013.01); *B01D 47/02* (2013.01); *B01D 47/021* (2013.01); *F24F 3/14* (2013.01);
(Continued)

(58) Field of Classification Search
CPC ......... B01D 47/02; B01D 47/021; F24F 6/18; F24F 3/14
See application file for complete search history.

(56) References Cited

U.S. PATENT DOCUMENTS 3,967,466 A    7/1976   Edwards
4,213,769 A *  7/1980   Nagelmeyer .......... A62B 11/00
                                                     261/122.1
(Continued)

FOREIGN PATENT DOCUMENTS

CN    1074291 A    7/1993
CN    1563820 A    1/2005
(Continued)

OTHER PUBLICATIONS

International Search Report dated Mar. 12, 2018 for International Application No. PCT/EP2017/083425 filed Dec. 19, 2017.
(Continued)

*Primary Examiner* — Robert A Hopkins
(74) *Attorney, Agent, or Firm* — Blue Filament Law PLLC

(57) ABSTRACT

The facility (1A) includes at least two treatment devices (2) each with an exchange chamber (20) intended to contain a liquid bath in the bottom part and at least one injection line (21). An aeraulic means (4), creates by suction or by blowing, simultaneously and in parallel for each treatment device (2), an incoming gas stream (F) originating from outside the exchange chambers (2) and passes through the discharge opening of the injection line (21) by being introduced into the liquid bath contained in the bottom part of the exchange chamber (20), below the surface (S) of said liquid bath. The exchange chambers (20) communicate hydraulically with one another so that when the aeraulic means (4) are shut down, each exchange chamber (20) is suitable for containing or contains, in the bottom part, an initial volume ($V_{initial}$) of liquid, with an initial liquid level ($H_{initial}$) that is identical in all the exchange chambers (2).

13 Claims, 9 Drawing Sheets

(51) Int. Cl.
*F24F 3/14* (2006.01)
*F24F 8/10* (2021.01)
*B01D 47/02* (2006.01)
*F24F 5/00* (2006.01)
*F24F 6/00* (2006.01)

(52) U.S. Cl.
CPC ........ F24F 8/10 (2021.01); *F24F 2005/0025* (2013.01); *F24F 2006/008* (2013.01)

(56) References Cited

U.S. PATENT DOCUMENTS

| 7,604,689 | B2 | 10/2009 | Siverklev |
| 2008/0173031 | A1 | 7/2008 | Duesel et al. |
| 2017/0320006 | A1 | 11/2017 | Zemmouri |

FOREIGN PATENT DOCUMENTS

| CN | 1871479 | A | 11/2006 |
| EP | 2910297 | A1 | 8/2015 |
| GB | 719932 | A | 12/1954 |
| JP | 2000334259 | A | 12/2000 |
| JP | 2002357333 | A | 12/2002 |
| JP | 2005013789 | A | 1/2005 |
| WO | 2016040628 | A1 | 3/2016 |
| WO | 2016071648 | A2 | 5/2016 |

OTHER PUBLICATIONS

Office action issued in corresponding Japanese Patent Appln. No. JP2019-535328, dated Nov. 18, 2021.

\* cited by examiner

FACILITY FOR PRODUCING AND TREATING A GAS STREAM THROUGH A VOLUME OF LIQUID

TECHNICAL FIELD

The present invention relates to the production and treatment of gas streams through a volume of liquid. It is applicable in varied fields, for example, and non-exhaustively, the recovery of calories in a gas stream, and in particular in a hot air stream or in industrial fumes, the production of a gas stream that is heated or cooled upon passing through said volume of liquid, the production of a gas stream whose temperature is controlled and/or whose absolute humidity is controlled, the humidification or dehumidification of a gas stream, the cleanup or filtering of a gas stream, the heating or air-conditioning of a site or industrial, service sector or household buildings, or the control of the hygrometry of a site or industrial, service sector or household buildings.

PRIOR ART

The use of a liquid, for example water, to treat, and in particular to heat or cool, a gas stream by heat exchange between the liquid and the gas stream, with placement of the gas stream and the liquid in direct contact, is an old technique, which has the advantage of being eco-friendly, since it in particular avoids using heat transfer fluids of the coolant type. The heating or cooling of the gas stream, and in particular an air stream, can for example be intended to produce a gas stream having a controlled temperature and/or intended to produce a gas stream having a controlled absolute humidity.

A first known solution for carrying out this technique consists in passing the gas stream through a curtain of fine droplets of the liquid or through an exchange surface permeable to the gas and containing the liquid, for example a textile material imbibed with water, or circulating the gas stream in contact with moistened plates. The main drawback of this type of solution lies in the very low energy yield of the heat exchange between the liquid and the gas stream, and in the low air flow rates that can be obtained.

A second known solution consists in passing the gas stream, and in particular the air stream, directly through a volume of liquid contained in an exchange enclosure, by injecting the air stream into the volume of liquid, below the surface of said volume of liquid. This type of solution is described, for example, in international patent application WO 2006/138287 and in American U.S. Pat. No. 4,697,735 (FIG. 3). This type of solution is also described in the international patent application WO2016/071648, which outlines the use of an exchange enclosure which is open at the bottom and submerged in a volume of liquid. This second technical solution has the advantage of allowing a higher energy yield of the heat exchanges between the liquid and the gas stream to be achieved than that in the first technical solution.

Using this second technical solution, for a given gas flow rate, the efficiency of the heat transfer between the gas stream and the liquid depends on the volume of liquid through which the gas stream passes in the exchange enclosure of the device. As a result, in practice, the greater the gas flow rate, the greater the cross sectional enclosure area in a horizontal plane must be to maintain the efficiency of the heat transfer. Thus when using for example a device of the type described in the above-mentioned international patent application WO2016/071648, in order to increase the gas flow rate, one of the transverse dimensions of the exchange enclosure therefore has to be increased, which in practice leads to an excessive increase in the overall size of the device. Moreover, and above all, it has been found that, above a certain gas flow rate, the increase in the volume of liquid in the exchange enclosure would not allow the efficiency of the heat transfer between the gas stream and the volume of liquid through which the gas stream passes in the exchange enclosure to be maintained, in particular due to the loss of efficiency arising from edge effects at the walls of the exchange enclosure. This type of device is therefore limited in terms of gas flow rate.

OBJECT OF THE INVENTION

One object of the invention is to provide a simple new technical solution to producing, at a high flow rate, gas streams treated by being passed through a liquid.

SUMMARY OF THE INVENTION

The invention thus relates to a facility for producing and treating a gas stream, having the following technical features. Said facility includes at least two treatment devices each including an exchange enclosure containing a liquid bath at the bottom; each exchange enclosure includes at least one opening for discharging a gas stream; each treatment device includes at least one injection conduit having at least one intake opening and at least one discharge opening; said facility further includes aeraulic means, which are connected to all the discharge openings of the exchange enclosures or which are connected to all the intake openings of the injection conduits, and which, during operation, make it possible to create, by suction or blowing, simultaneously and in parallel for each treatment device, an incoming gas stream coming from the outside of the exchange enclosures, such that each incoming gas stream is introduced into the injection conduit of the corresponding treatment device, and passes through the discharge opening of the injection conduit by being introduced into the liquid bath contained in the bottom of the exchange enclosure, below the surface of said liquid bath, and such that an outgoing gas stream, treated by direct contact with said liquid bath, rises up inside the exchange enclosure and is discharged out of said exchange enclosure by passing through the discharge opening of the exchange enclosure; the exchange enclosures communicate hydraulically with one another so that, when the aeraulic means are not operating, each exchange enclosure (20) contains, at its bottom, an initial volume of liquid, with an initial level ($H_{initial}$) of liquid that is identical in all the exchange enclosures.

More particularly, but optionally according to the invention, the facility may include the additional and optional technical features below, taken individually or in combination:

- The discharge openings of the injection conduits are all positioned substantially at the same depth relative to the surface of the initial volume of liquid contained in each exchange enclosure when the aeraulic means are not operating.
- The initial volumes (of liquid in all the exchange enclosures) are identical.
- The aeraulic means include a fan or compressor connected to all the discharge openings of the exchange enclosures or connected to all the intake openings of the injection conduits.

The facility includes a liquid supply, and the bottom of each exchange enclosure includes at least one liquid intake opening and is submerged in the same liquid bath (L) contained in said supply, so that, when the aeraulic means are not operating, the bottom of each exchange enclosure contains an initial volume of this liquid, with a level ($H_{initial}$) of liquid which is identical in all the exchange enclosures.

The object of the invention is also to use the aforementioned facility to produce, in parallel, multiple gas streams which have been treated by being passed through a volume of liquid contained in each exchange enclosure.

BRIEF DESCRIPTION OF THE FIGURES

The features and advantages of the invention will become apparent from reading the detailed description below of several particular embodiments of the invention, which particular embodiments are described as non-limiting and non-exhaustive examples of the invention, and with reference to the accompanying drawings in which.

DETAILED DESCRIPTION

Figure 1:
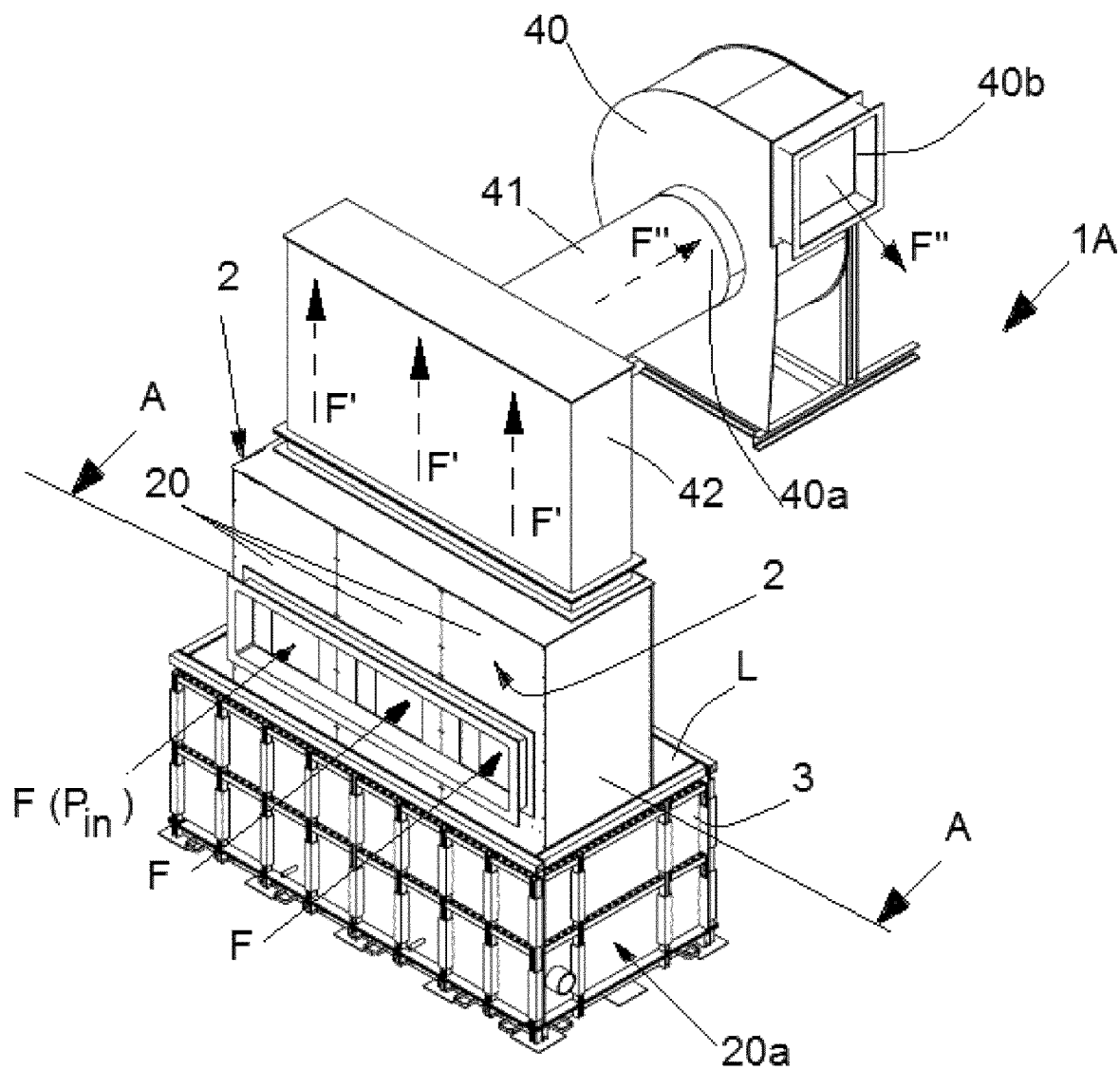
FIG. 1 is an isometric view of a facility according to the invention.

With reference to the particular embodiment of FIG. 1, the facility 1A for producing and treating a gas stream includes a liquid supply formed of a tub 3 open at the top and intended to contain a liquid bath L, and for example water, and three treatment devices 2, each including an exchange enclosure 20.

For the supply of liquid, and in particular of water, to the tub 3, the facility 1A further includes liquid supply means (not shown in FIG. 1) having a liquid supply conduit which opens into the tub 3, above the liquid bath, and which is equipped with a supply valve for controlling the supply of liquid to the tub 3.

The facility 1A further includes discharge means (not shown in FIG. 1) having a discharge conduit which is in communication with the inside of the tub 3, at its bottom, below the surface of the liquid bath contained in the tub 3, and which is equipped with a discharge valve for controlling the discharge of the liquid out of the tub 3.

Figure 2:
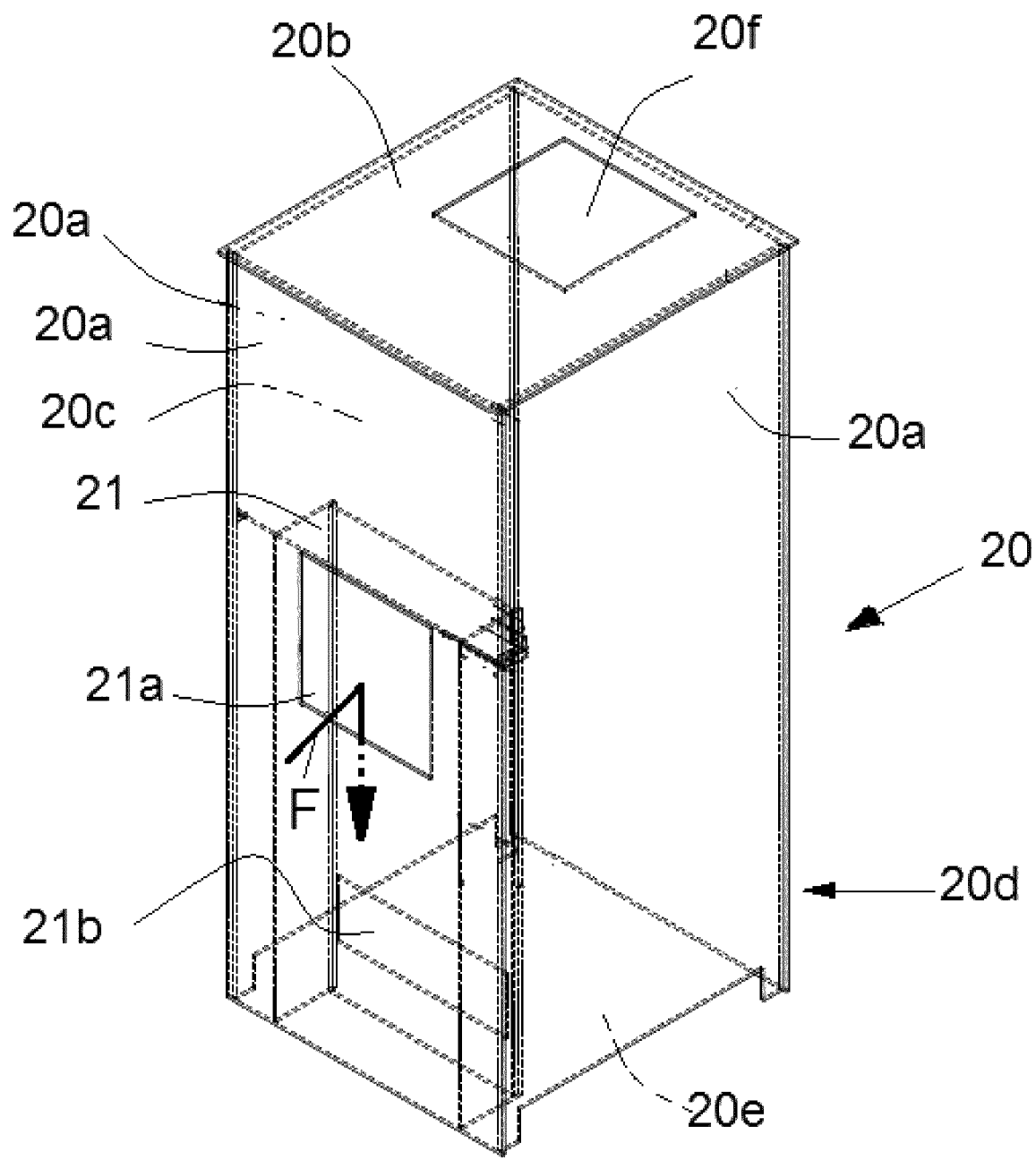
FIG. 2 is an isometric view of a treatment device of the facility in FIG. 1.

Referring to FIG. 2, each exchange enclosure 20 has four side walls 20a, which are joined to an upper wall 20b so as to define an inner chamber 20c, which in this particular example has a quadrangular horizontal cross section. The geometry of this horizontal cross section is of no importance to the invention. In another variant, this horizontal cross section may be of any shape and may be circular or polygonal, for example.

The lower face of the bottom 20d of each exchange enclosure 20 is open and thus forms a liquid intake opening 20e. This bottom 20d of each exchange enclosure 20 is positioned in the tub 3, for example by being placed on the bottom wall of the tub 3, so that by filling the tub 3 with a sufficient level of liquid, the bottom 20d of each exchange enclosure 20 is submerged in the liquid bath contained in the tub 3, and the submerged part of each exchange enclosure 20 contains a liquid bath having an initial volume $V_{initial}$.

In the particular example illustrated in the figures, in order to reduce the overall size, the exchange enclosures 20 are positioned close together. In another variant, they may be spaced apart.

Preferably, as shown in the accompanying figures, the exchange enclosures 20 are all identical. In another variant, they may be different.

Referring to FIG. 2, each exchange enclosure 20 includes in its upper wall 20b at least one opening 20f for discharging a gas stream. Each device 2 includes at least one vertical injection conduit 21 inside the exchange enclosure 20. This injection conduit 21 includes, in the top, an opening 21a for the intake of a gas stream and, in the bottom, an opening 21b for discharging a gas stream.

Referring to FIG. 1, the facility 1A further includes aeraulic means 4 including a fan 40. The air intake 40a of this fan 40 is connected, by means of a pipe 41 and a hood 42, to all the discharge openings 20f of all the exchange enclosures 20. The air outlet 40b of this fan 40 opens into the open air.

In another variant, the air outlet 40b of the fan 40 may be connected to a pipe so that air is sent to another device in another facility.

In the embodiment illustrated in FIG. 1, the fan 40 is a centrifugal fan. In the context of the invention, the aeraulic means 4 may include any known type of gas compressor, the fan 40 may also be an axial fan, a pump, etc.

Moreover, in the illustrated variant, a single fan 40, common to all devices 2, is used. In another variant, a plurality of fans 40 may be used in parallel, and for example one fan 40 for each treatment device 2.

When the aeraulic means 4 are not operating, the tub 3 contains an initial volume of liquid L corresponding to an initial level of liquid (FIG. 3/liquid height $H_{initial}$) in the tub 3 outside the exchange enclosures 20 of the treatment devices 2. Since the exchange enclosures 20 are in hydraulic communication with one another via their liquid intake openings 20e and via the tub 3, the submerged bottom of each exchange enclosure 20 contains an initial volume $V_{initial}$ of liquid which is such that the initial height $H_{initial}$ of liquid in each exchange enclosure 20 is identical in all the exchange enclosures 20 and is sufficient at least for the discharge opening 21b of the injection conduit 21 to be positioned below the liquid surface S in the exchange enclosure 20.

Preferably, these initial volumes of liquid $V_{initial}$ are also identical in all the exchange enclosures 20.

Figure 3:
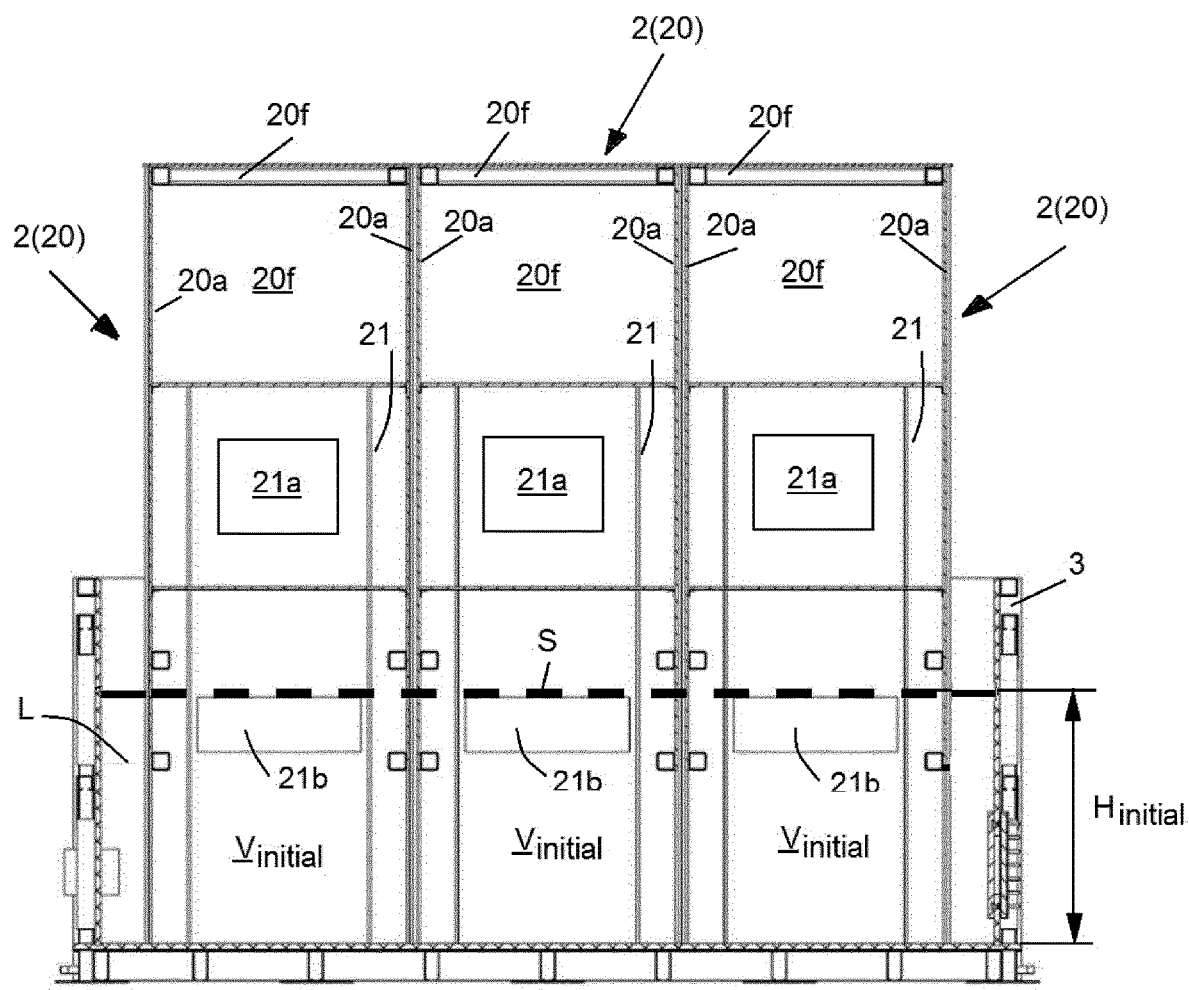
FIG. 3 is a cross-sectional view of the facility in FIG. 1 in the vertical sectional plane A-A of FIG. 1, when the fan of the facility is not operating.

Preferably, as illustrated in FIG. 3, the discharge openings 21b of the injection conduits 21 are all positioned at the same depth relative to the surface S of the initial volume $V_{initial}$ of liquid contained in each exchange enclosure 20 when the aeraulic means 4 are not operating.

When the fan 40 is being operated, the inside of each exchange enclosure 20 is simultaneously depressurized. When the fan 40 is operating, the pressure Pin at the inlet of each injection conduit 21 is greater than the pressure Pout above the volume of liquid in the exchange enclosure 20. This pressure difference ΔP (ΔP=Pin−Pout) in each exchange enclosure 20 (FIG. 4) results in a rise in the level (FIG. 4/height h) of the liquid in each exchange enclosure 20 and a decrease in the level of liquid (FIG. 4/height H) in the tub 3 outside the exchange enclosures 20.

Figure 4:
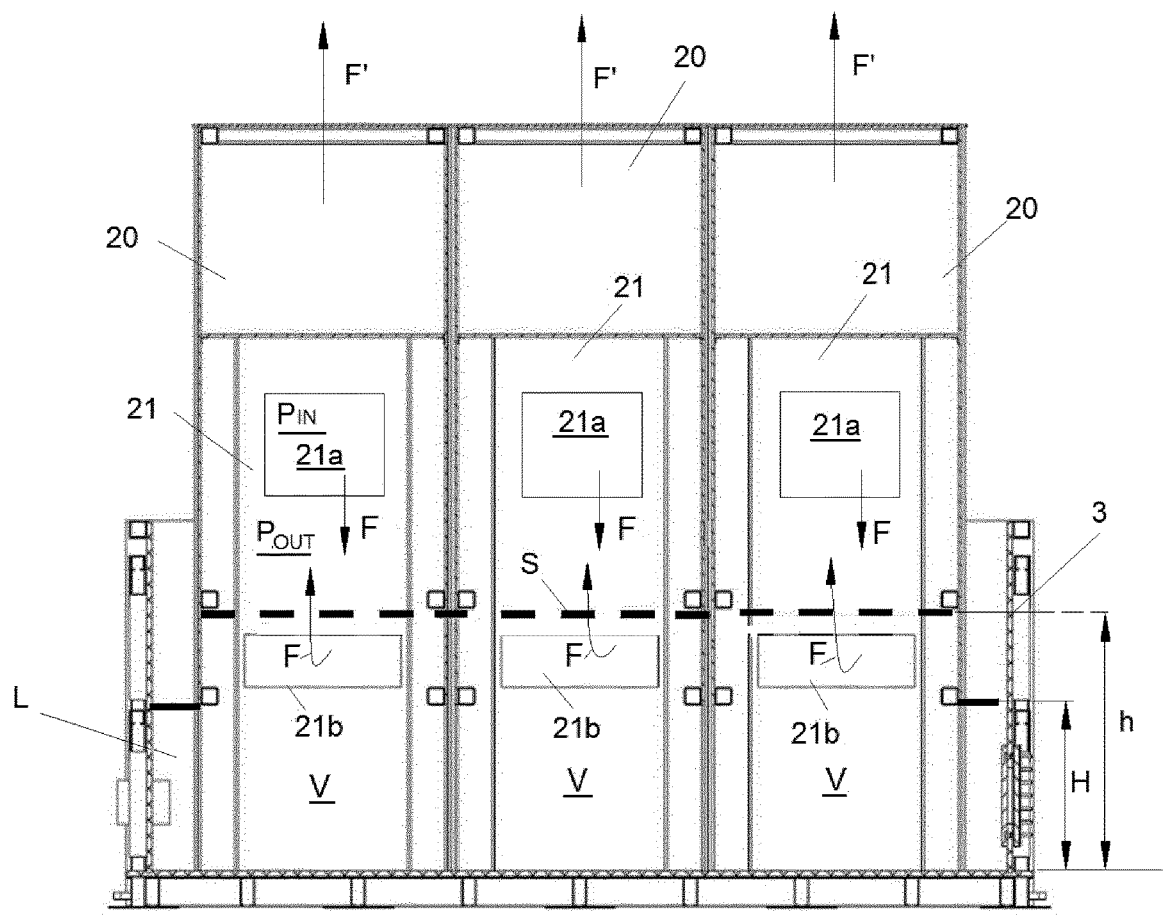
FIG. 4 is a cross-sectional view of the facility of FIG. 1 in the vertical sectional plane A-A of FIG. 1, when the fan of the facility is operating.

The volume of liquid V and the level h of liquid in each exchange enclosure 20 depends on this pressure difference ΔP. In FIG. 4, it was considered that the pressure differences ΔP in each exchange enclosure 20 were identical, which results in identical levels h of liquid. In the context of the invention, the pressure differences ΔP may be different, which in this case results in different levels h of liquid in the exchange enclosures 20.

When the fan 40 is operating, it sucks up, in parallel and simultaneously in each exchange enclosure 20, an incoming gas stream F (FIG. 1), from outside the exchange enclosures 20, each incoming gas stream F entering the injection conduit 21 of the corresponding exchange enclosure 20 through the intake opening 21a of this conduit 21. In this particular application, since the intake openings 21a open into the open air, each gas stream F is a stream of air coming from the air in the environment outside the exchange enclosures 20.

For each exchange enclosure 20, this incoming gas stream F (untreated) is introduced into the non-submerged part of the injection conduit 21, passes through the discharge opening 21b of the submerged bottom of the injection conduit 21 and is introduced into said volume of liquid V contained in the submerged bottom of the enclosure, below the surface S of said volume of liquid. An outgoing gas stream F', treated by direct contact with said volume of liquid contained in the exchange enclosure 20, rises up inside the exchange enclosure 20, outside the injection conduit 21 and is discharged out of said exchange enclosure by passing through the discharge opening 20f of the enclosure.

These outgoing gas streams F' are sucked up by the fan 40 and discharged in the form of a gas stream F''' (FIG. 1).

When the temperature of the volume of liquid V in the enclosure 20 is different from the temperature of the gas stream F prior to its introduction into the volume V of liquid, heat exchanges occur between the gas and the liquid by sensible heat and latent heat.

When the temperature $T_{Liquid}$ of the volume of liquid is less than the initial temperature $T_{initial}$ of the gas stream F before its introduction into the volume of liquid, the gas stream F' is cooled. More particularly, the temperature of the outgoing gas stream F' has been decreased and may, for example, be substantially equal to the temperature $T_{Liquid}$ of the volume of liquid. It follows necessarily that the outgoing gas stream F' from the device 1 has been dehumidified with respect to the incoming gas stream F, the absolute humidity (weight of water per volume of air) in the outgoing gas stream F' being lower than the absolute humidity of the incoming gas stream F.

Conversely, when the temperature $T_{Liquid}$ of the volume of liquid is greater than the initial temperature $T_{initial}$, the outgoing gas stream F' is heated and may for example be at a temperature substantially equal to the temperature $T_{Liquid}$ of the volume of liquid. It follows necessarily that the outgoing gas stream F' from the device 1 has been humidified with respect to the incoming gas stream F, the absolute humidity (weight of water per volume of air) in the outgoing gas stream F' being greater than the absolute humidity of the incoming gas stream F.

In certain applications, the treatment devices 2 can be used to filter or clean up the incoming gas stream F by passing said stream through a volume of liquid V. The treatment devices 2 may also be used for condensing or evaporating one or more components transported by the incoming gas stream F by passing said stream through a volume of liquid V. Depending on the application, the temperature of the volume of liquid may be higher or lower than the temperature of the incoming gas stream F, or substantially equal to the temperature of the incoming gas stream F. When the temperature of the volume of liquid is substantially equal to the temperature of the incoming gas stream F, an outgoing gas stream F' is produced at the outlet of the device 1 that has not been heated or cooled, but is substantially at the same temperature as the incoming gas stream F.

The invention advantageously makes it possible to work with a flow rate at the outlet of the fan 40 which may be high, and for example greater than 10,000 m³/h, and more particularly still in certain applications greater than 100,000 m³/h, without affecting the quality of the treated gas streams F'. It is also easy to increase the flow rates of the treated gas streams by increasing the number of treatment devices 2, without affecting the quality of the treated gas streams F'.

It is important to note that, in many applications, the pressure Pin or pressure Pout may differ from one treatment device 2 to another and/or may vary differently over time from one treatment device 2 to another. The same applies to the flow rates of the gas streams F and F'.

In the invention, when the aeraulic means 4 are not operating, the level of liquid $H_{initial}$ in the exchange enclosures 20 is always equal for all the treatment devices 2, which advantageously allows there to be, at the outlet of the exchange enclosures 20, outgoing gas streams F' which have substantially the same characteristics, especially with respect to their temperature and humidity. Comparatively, if the liquid supply L was not common to all the treatment devices, but rather each device 2 had its own independent tub 3 that does not communicate hydraulically with the other tubs 3, in this case it would be necessary to implement extremely complicated and unreliable control to try to maintain the same level of liquid $H_{initial}$ automatically in all the enclosures 20, in the event of a pressure difference Pin or pressure difference Pout in at least one of the treatment devices 2 by comparison with the other treatment devices.

The invention is not limited to the use of water as liquid L, but extends to any other type of liquid. By way of non-limiting and non-exhaustive examples, it may be advantageous to use in certain applications a liquid L whose solidification temperature at atmospheric pressure is less than 0° C., such as, for example, water containing salt, carbohydrate, glycol or alcohol additives. It may also be advantageous to use oil as liquid L.

In the variant which has been described, the fan 40 makes it possible to create the gas streams F and F' by suction. In another variant, the fan 40 may be connected to the intake openings 21a of the injection conduits 21, so as to create these gas streams F and F' by blowing and not by suction.

In the variant of FIG. 1, the tub 3 is open at the top, the volume of liquid outside the exchange enclosures 20 being at atmospheric pressure. In another variant, the tub 3 may be closed in an airtight manner.

Figure 5:
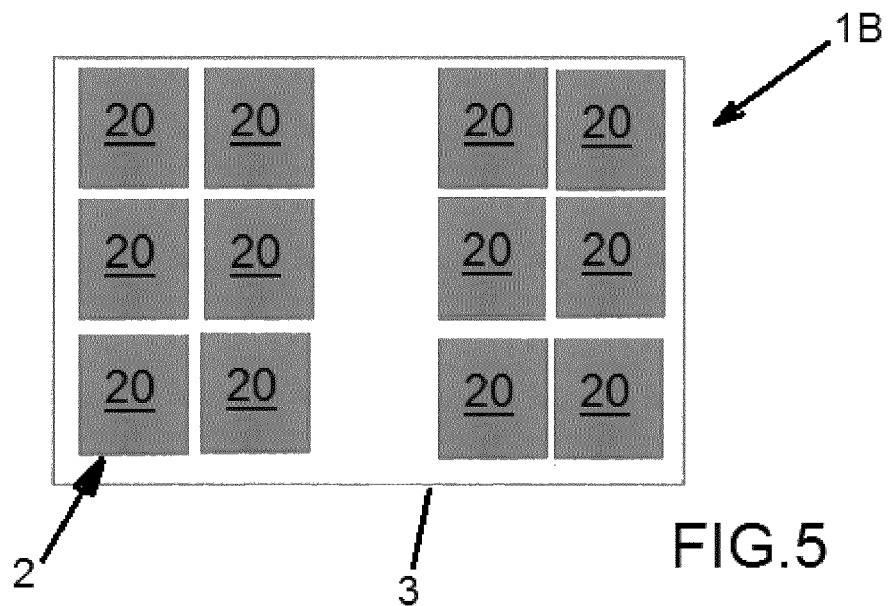
FIG. 5 is a schematic view of a second embodiment of a facility of the invention.

FIG. 5 is a schematic view of another configuration of a facility 1B in which the exchange enclosures 20 share the same tub 3, as in the variant of FIG. 1, but are not contiguous.

Figure 6:
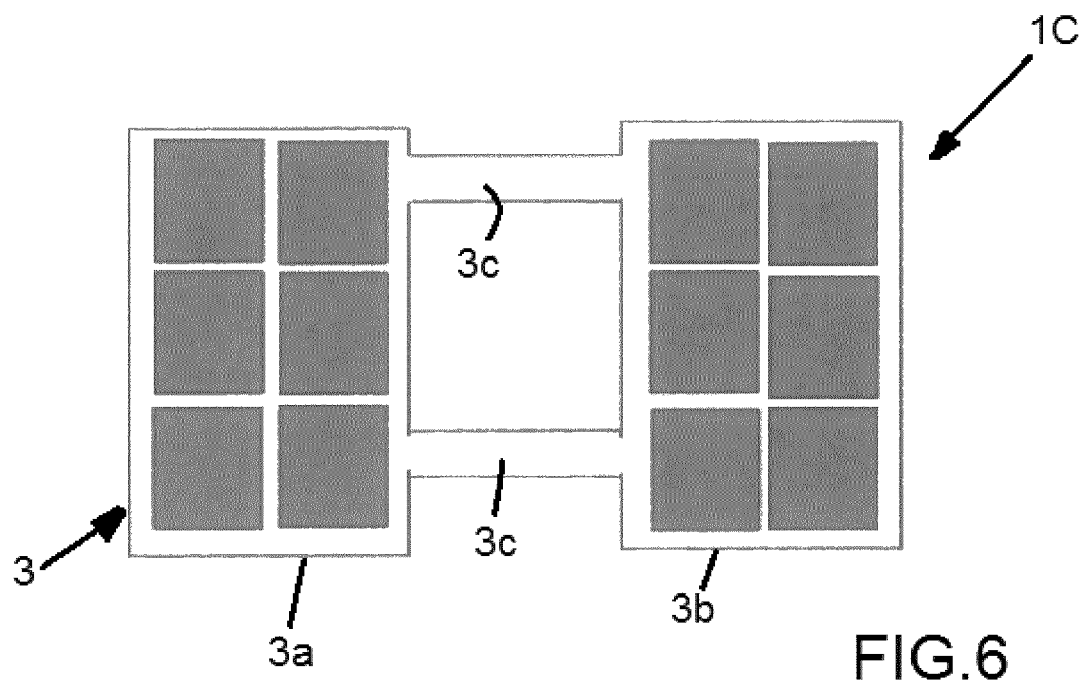
FIG. 6 is a schematic view of a third embodiment of a facility of the invention.

FIG. 6 is a schematic view of another configuration of a facility 1C in which the tub 3 is formed of two tub parts 3a and 3b, which communicate hydraulically with one another by means of piping 3c, so that, when the aeraulic means are not operating, the two parts 3a and 3b of tub 3 contain the same level of liquid corresponding to an initial height $H_{initial}$ of liquid in each exchange enclosure 20 which is identical in all the exchange enclosures 20.

Figure 7:
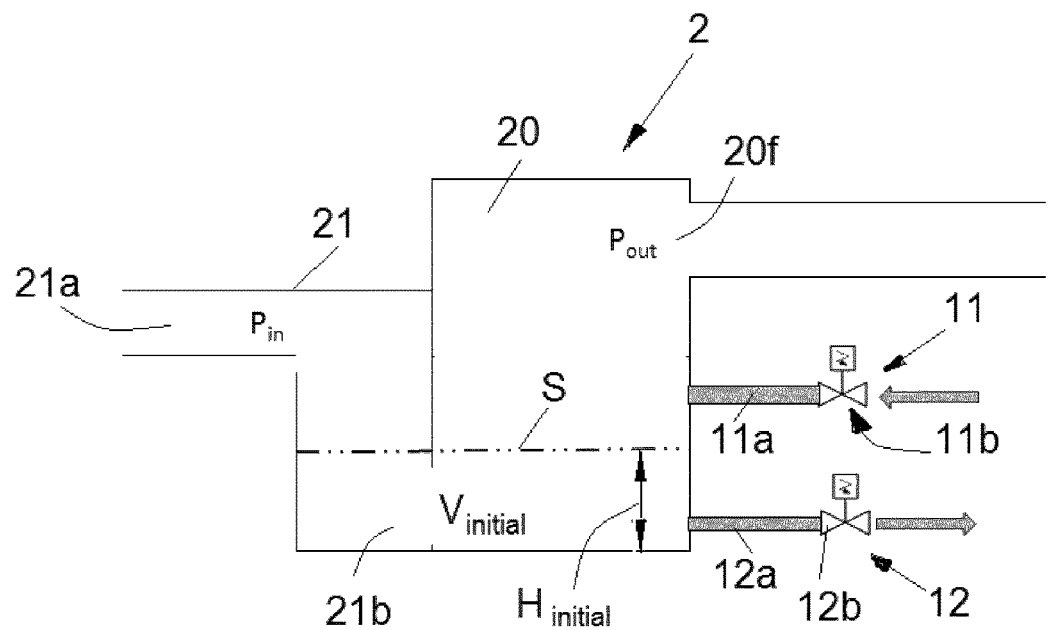
FIG. 7 is a schematic sectional view of a treatment device of a fourth embodiment of a facility of the invention, when the aeraulic means of the facility are not operating.
Figure 8:
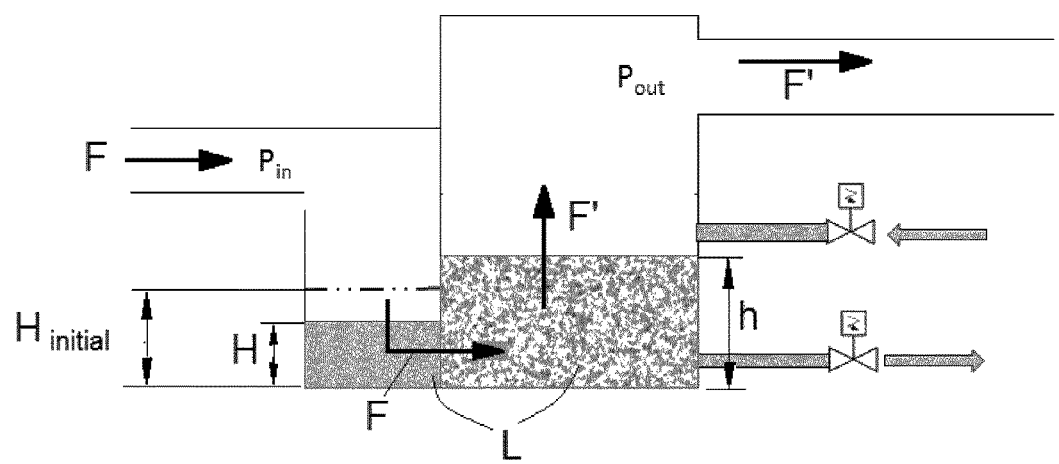
FIG. 8 is a schematic sectional view of a treatment device of said fourth embodiment of a facility of the invention, when the aeraulic means of the facility are operating.
Figure 9:
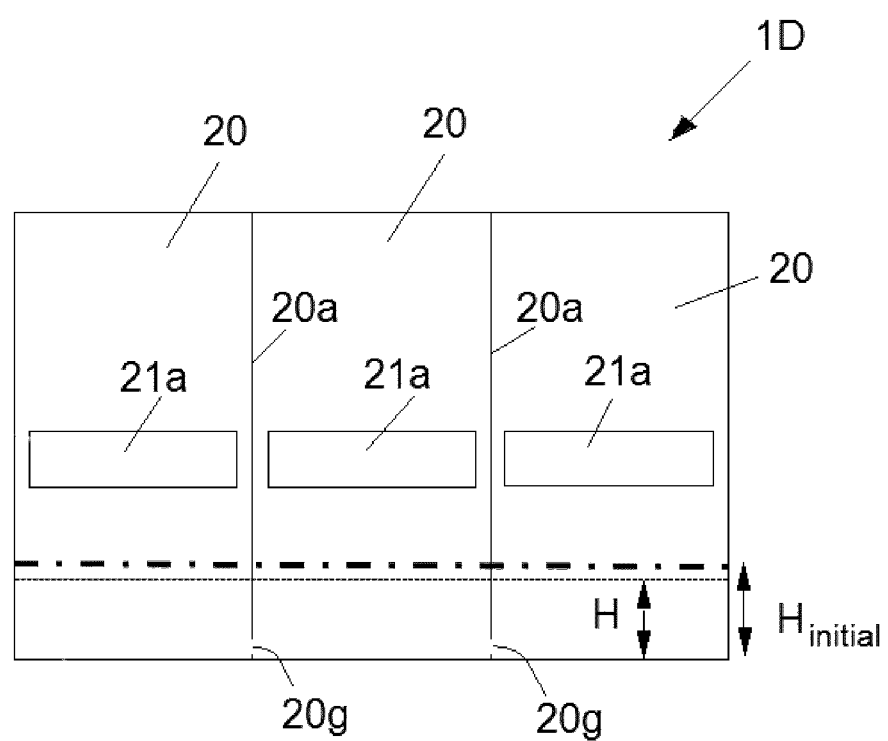
FIG. 9 is a schematic sectional view showing the three treatment devices of said fourth embodiment of a facility of the invention.

FIGS. 7 to 9 show another embodiment variant of a facility 1D according to the invention, which includes three treatment devices 2, but which, unlike the variants of FIGS. 1 to 6, does not include tub 3. In these figures, the aeraulic means have not been shown, and similarly to what has been previously described, these aeraulic means include a fan or compressor whose air intake is connected in parallel to all the discharge openings 20f of all the exchange enclosures 20.

Referring to FIG. 7, in this variant, each treatment device 2 includes an injection conduit 21, which is outside the exchange enclosure 20. This injection conduit 21 includes an opening 21a for the intake of a gas stream which is in communication with the outside of the exchange enclosures 20 of the facility 1D and an opening 21b for discharging a gas stream which is in communication with the inside of the exchange enclosure 20 of the treatment device 2.

Referring to FIG. 9, in this variant, the exchange enclosures 20 are in hydraulic communication with one another through openings 20g formed in the partition walls 20a between the exchange enclosures 20.

For the supply of liquid, and in particular of water, to the exchange enclosures 20, the facility 1D further includes liquid supply means 11 including a supply conduit 11a, which opens into one of the enclosures 20, and which is equipped with a supply valve 11b for controlling the supply of liquid to the exchange enclosures 20. The facility 1D further includes discharge means 12 including a discharge conduit 12a, which is in communication with the inside of one of the exchange enclosures 20, at its bottom, below the surface of the liquid bath contained in the enclosures, and which is equipped with a discharge valve 12b for controlling the discharge of the liquid out of the exchange enclosures 20.

Referring to FIG. 7, when the aeraulic means are not operating, since the exchange enclosures 20 are in hydraulic communication with one another via the openings 20g, the bottom of each exchange enclosure 20 contains an initial volume $V_{initial}$ of liquid which is such that the initial height $H_{initial}$ of liquid in each exchange enclosure 20 is identical in all the exchange enclosures 20 and is sufficient at least for the discharge opening 21b of the injection conduit 21 to be positioned below the liquid surface S in the exchange enclosure 20.

When the aeraulic means are being operated, the inside of each exchange enclosure 20 is simultaneously depressurized. The pressure Pin at the inlet of each injection conduit 21 is greater than the pressure Pout above the volume of liquid in the exchange enclosure 20. This pressure difference ΔP (ΔP=Pin−Pout) in each exchange enclosure 20 (FIG. 8) results in a rise in the level (FIG. 8/height h) of the liquid in each exchange enclosure 20 and a decrease in the level of liquid (FIG. 8/height H) in each injection conduit 21 outside the exchange enclosures 20.

During operation, when the pressure differences ΔP in each exchange enclosure 20 are identical, the levels h of liquid in each exchange enclosure 20 are identical. On the other hand, if during operation the pressure differences ΔP are different, in this case the levels h of liquid in the exchange enclosures 20 are different.

Figure 10:
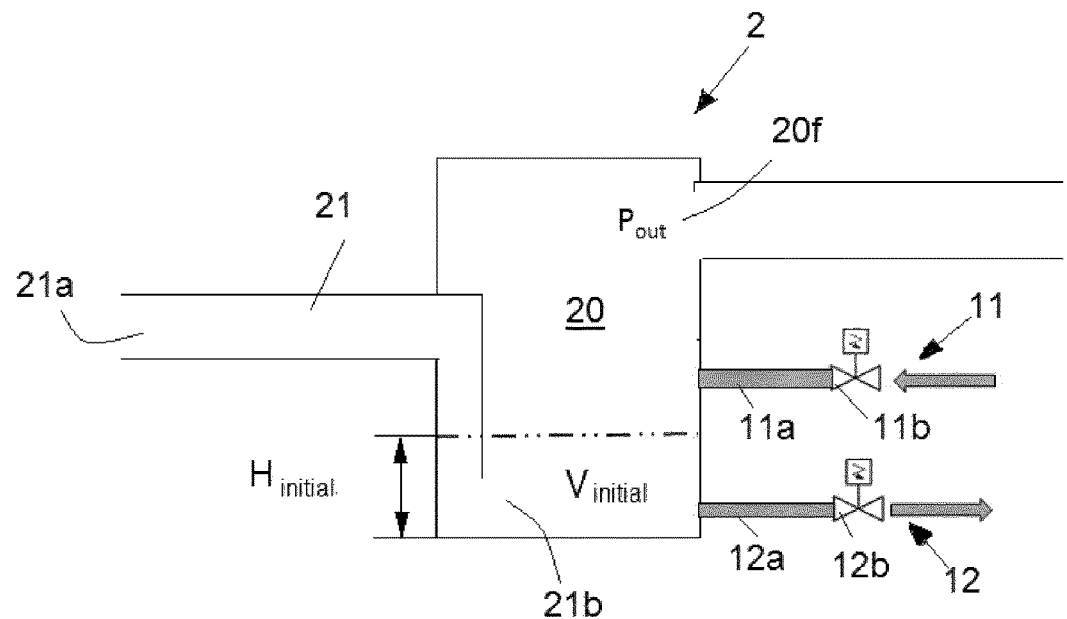
FIG. 10 is a schematic sectional view of a treatment device of a fifth embodiment of a facility of the invention, when the aeraulic means of the facility are not operating.
Figure 11:
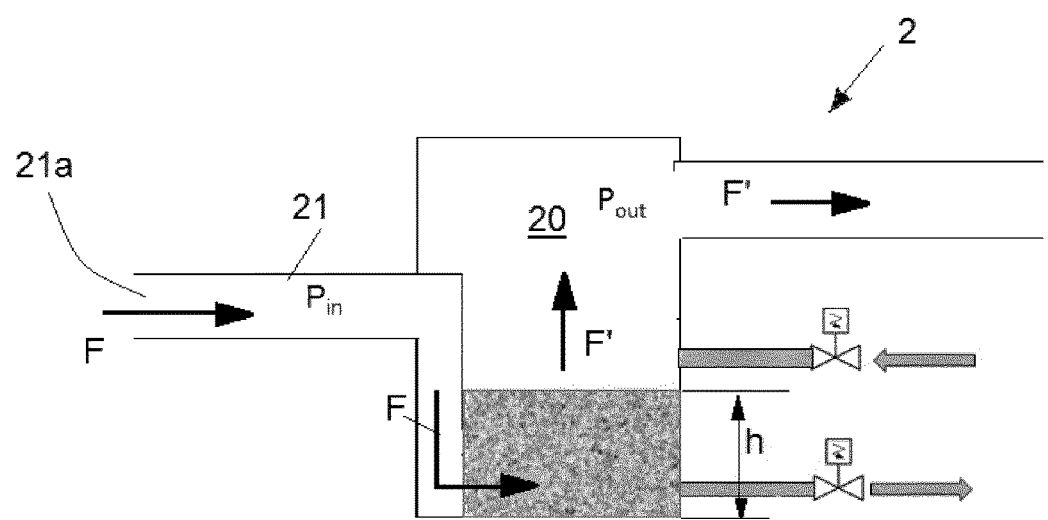
FIG. 11 is a schematic sectional view of a treatment device of said fifth embodiment of a facility of the invention, when the aeraulic means of the facility are operating.
Figure 12:
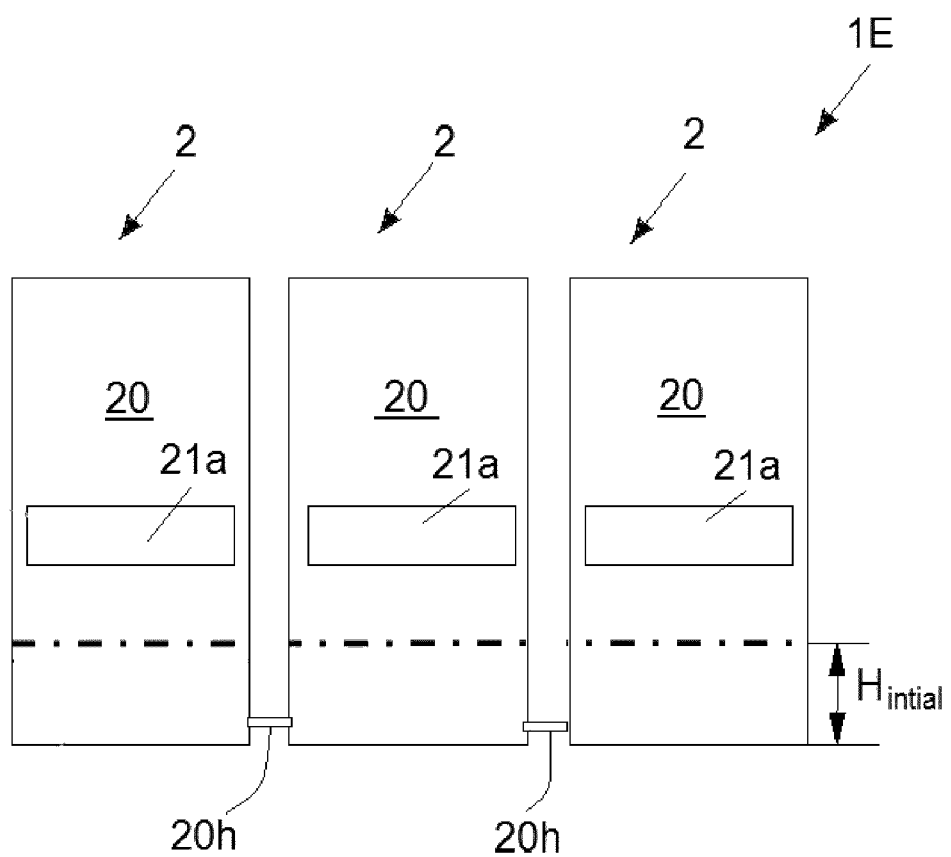
FIG. 12 is a schematic sectional view showing the three treatment devices of said fifth embodiment of a facility of the invention.

FIGS. 10 to 12 show another embodiment of a facility 1E according to the invention, which includes three treatment devices 2. In these figures, the aeraulic means have not been shown, and similarly to what has been previously described, include a fan or compressor whose air intake is connected in parallel to all the discharge openings 20f of all the exchange enclosures 20.

Referring to FIG. 10, in this variant, each treatment device 2 includes an injection conduit 21, of which part is located inside the exchange enclosure 20 and which includes an air intake opening 21a in communication with the outside of the exchange enclosures 20 of the facility 1E and an air discharge opening 21b in communication with the inside of the exchange enclosure 20 of the treatment device 2.

Referring to FIG. 12, in this variant, the exchange enclosures 20 are spaced apart and are in hydraulic communication with one another by means of conduits 20h.

The facility of the invention can be used in all applications where it is useful to treat a gas stream by passing it through a volume of liquid. It is thus applicable in varied fields, for example, and non-exhaustively, the recovery of calories in a gas stream, and in particular in a hot air stream or in industrial fumes, the production of a gas stream that is heated or cooled upon passing through said volume of liquid, the production of a gas stream whose temperature is controlled and/or whose absolute humidity is controlled, the humidification or dehumidification of a gas stream, the cleanup or filtering of a gas stream, the heating or air-conditioning of a site or industrial, service sector or household buildings, or the control of the hygrometry of a site or industrial, service sector or household buildings. The gas stream produced can also be used to cool, heat, humidify or dehumidify any type of object or surface.

The invention claimed is:

1. A facility (1A; 1B; 1C; 1D; 1E) for producing and treating a gas stream, said facility including at least two treatment devices (2) each including an exchange enclosure (20) containing a liquid bath in its bottom, wherein each exchange enclosure includes at least one opening (20f) for discharging a gas stream, wherein each treatment device (2) includes at least one injection conduit (21) having at least one intake opening (21a) and at least one discharge opening (21b), said facility further including aeraulic means (4), which are connected to all the discharge openings (20f) of the exchange enclosures (20) or which are connected to all the intake openings (21a) of the injection conduits (21), and which, during operation, make it possible to create, by suction or blowing, simultaneously and in parallel for each treatment device (2), an incoming gas stream (F) coming from the outside of the exchange enclosures (2), wherein each injection conduit (21) of the corresponding treatment device (2) is designed to introduce each corresponding incoming gas stream (F) and to allow said stream to pass through the discharge opening (21b) of the injection conduit (21), said discharge opening (21b) of the injection conduit (21) being designed to introduce said stream into the liquid bath contained in the bottom of the exchange enclosure (20), below the surface (S) of said liquid bath, and the exchange enclosure is designed to allow an outgoing gas stream (F'), treated by direct contact with said liquid bath, to rise up inside the exchange enclosure, and to discharge said outgoing gas stream out of said exchange enclosure (20) by allowing it to pass through the discharge opening (20f) of the exchange enclosure (20), wherein the exchange enclosures (20) communicate hydraulically with one another so that, when the aeraulic means (4) are not operating each exchange enclosure (20) contains, at its bottom, an initial volume ($V_{initial}$) of liquid, with an initial level ($H_{initial}$) of liquid which is identical in all the exchange enclosures (2).

2. A facility according to claim 1, wherein the discharge openings (21b) of the injection conduits (21) are all positioned substantially at the same depth relative to the surface (S) of the initial volume ($V_{initial}$) of liquid contained in each exchange enclosure (20) when the aeraulic means (4) are not operating.

3. A facility according to claim 1, wherein the initial volumes ($V_{initial}$) of liquid in all the exchange enclosures (20) are identical.

4. A facility according to claim 1, wherein the aeraulic means (4) include a fan or compressor (40) connected to all the discharge openings (20f) of the exchange enclosures (20) or connected to all the intake openings (21a) of the injection conduits (21).

5. A facility according to claim 1, including a supply (3) of liquid (L), and wherein the bottom (20d) of each exchange enclosure (20) includes at least one liquid intake opening (20e) and is submerged in the same liquid bath (L) contained in said supply (3), so that, when the aeraulic means (4) are not operating, the bottom of each exchange enclosure (20) contains an initial volume ($V_{initial}$) of this liquid, with a level ($H_{initial}$) of liquid which is identical in all the exchange enclosures (20).

6. A facility according to claim 2, wherein the initial volumes ($V_{initial}$) of liquid in all the exchange enclosures (20) are identical.

7. A facility according to claim 2, wherein the aeraulic means (4) include a fan or compressor (40) connected to all the discharge openings (20f) of the exchange enclosures (20) or connected to all the intake openings (21a) of the injection conduits (21).

8. A facility according to claim 3, wherein the aeraulic means (4) include a fan or compressor (40) connected to all the discharge openings (20f) of the exchange enclosures (20) or connected to all the intake openings (21a) of the injection conduits (21).

9. A facility according to claim 2, including a supply (3) of liquid (L), and wherein the bottom (20d) of each exchange enclosure (20) includes at least one liquid intake opening (20e) and is submerged in the same liquid bath (L) contained in said supply (3), so that, when the aeraulic means (4) are not operating, the bottom of each exchange enclosure (20) contains an initial volume ($V_{initial}$) of this liquid, with a level ($H_{initial}$) of liquid which is identical in all the exchange enclosures (20).

10. A facility according to claim 3, including a supply (3) of liquid (L), and wherein the bottom (20d) of each exchange enclosure (20) includes at least one liquid intake opening (20e) and is submerged in the same liquid bath (L) contained in said supply (3), so that, when the aeraulic means (4) are not operating, the bottom of each exchange enclosure (20) contains an initial volume ($V_{initial}$) of this liquid, with a level ($H_{initial}$) of liquid which is identical in all the exchange enclosures (20).

11. A facility according to claim 4, including a supply (3) of liquid (L), and wherein the bottom (20d) of each exchange enclosure (20) includes at least one liquid intake opening (20e) and is submerged in the same liquid bath (L) contained in said supply (3), so that, when the aeraulic means (4) are not operating, the bottom of each exchange enclosure (20) contains an initial volume ($V_{initial}$) of this liquid, with a level ($H_{initial}$) of liquid which is identical in all the exchange enclosures (20).

12. A method for producing multiple gas streams (F') in parallel using the facility according to claim 3, comprising treating said multiple gas streams (F') by passing said multiple gas streams (F') through a volume of liquid contained in each exchange enclosure (20).

13. A method for producing multiple gas streams (F') in parallel using the facility according to claim 4, comprising treating said multiple gas streams (F') by passing said multiple gas streams (F') through a volume of liquid contained in each exchange enclosure (20).

* * * * *